United States Patent Office 3,679,455

Patented July 25, 1972

3,679,455

PROCESS FOR THE PRODUCTION OF A SUPPORT FOR A PHOTOGRAPHIC SENSITIVE MATERIAL

Tsuneo Kasugai and Nobuhiko Minagawa, Shizuoka, Japan, assignors to Fuji Photo Film Co., Ltd., Kanagawa, Japan No Drawing. Filed Nov. 24, 1970, Ser. No. 92,529
Claims priority, application Japan, Nov. 27, 1969, 44/95,224
Int. Cl. G03c *1/78*
U.S. Cl. 117—47 6 Claims

ABSTRACT OF THE DISCLOSURE

A process for the production of a support for a photographic sensitive material comprising applying a subcoat comprising a hydrophilic resin to the surface of a polyolefin coated paper, said resin having a higher relative dielectric constant and a dielectric power factor than those of the polyelefin and good adhesion with a photographic emulsion, and treating the support with microwaves under the conditions that discharging does not occur to adhere the subcoat firmly to the polyolefin support is disclosed.

FIELD OF THE INVENTION

The present invention relates to a process for the production of a support for a photographic sensitive material comprising polyolefin film or polyolefin coated paper, especially to the process of subcoating thereof.

DESCRIPTION OF THE PRIOR ART

It is known that the adhesion between a photosensitive layer and support which is composed of cellulose acetate or a linear polyester is provided by applying a solution or a suspension of the resin adhesive to the photosensitive layer (referred to herein as the subcoating resin), the solvent of the solution or the suspension dissolving or swelling the surface of the support. The adhesive coating is generally called the sublayer.

However, there is no solvent which is suitable for swelling or dissolving the support of a polyolefin, namely, a polyethylene or a polypropylene.

Therefore, the generally utilized subcoating process, that is, the process of applying the solution or the suspension of the subcoating resin to the surface of the support and forming the sublayer is insufficient with respect to adhesive strength between the sublayer and the support.

Surface treatments of polyolefins for the purpose of increasing adhesion therewith, for example, an activation process such as an electric discharging process, a flame treatment and a chemical oxidation process with chromic acid and the like, are known but these processes have the following disadvantages.

In the electric discharging process and the flame treatment, the activated layer on the surface of the polyolefin support is so small in thickness and mechanical strength that it often separates from the surface of the support before the application of the photographic emulsion layer or the sublayer thereto.

Further, in the flame treatment, both unevenness in the treating effect due to variations in the flame strengh and danger in the use of flame occur. The treatment with chromic acid in unsuitable for the continuous treatment of long sized photographic supports because the treatment requires not only a long treating time but also washing and drying operations after treatment.

SUMMARY OF THE INVENTION

The present invention provides a process for producing a support for a photographic sensitive material. The process comprises applying a subcoat, consisting of a hydrophilic resin having both a higher relative dielectric constant and a dielectric power factor than the dielectric constant and the dielectric power factor of any polyolefin and having good adhesion with a photographic emulsion, to the surface of the polyolefin film or the polyolefin coated paper and applying microwaves thereto under conditions at which discharging does not occur to adhere the undercoat firmly to the polyolefin support.

DETAILED DESCRIPTION OF THE INVENTION

Suitable polyolefins which can be used in the present invention are, for example, polyethylene, polypropylene, and mixtures of polyethylene and polypropylene.

The characteristics of the polyethylenes and the polypropylenes are customarily described by reference to the Melt Index and the Melt-Flow Rate respectively. The Melt Index of the polyethylene is measured according to the method as described in ASTM D–1238–57T, and the Melt-Flow Rate of the polypropylene is measured according to the method as described in ASTM D–1238–65T.

A polyethylene having a Melt Index (M.I.) of from 0.1 to 20 and a polypropylene having a Melt-Flow (M.F.) rate of from 1 to 100 can be used herein.

For example, commercially available polyolefins include low density polyethylenes, such as Sumikathene L–705 (produced by the Sumitomo Chemical Co., Ltd.), NVC–8003 (produced by the Nippon Unicar Co.), Monsanto Polyethylene MPE–70 (produced by the Monsanto Chemical Co.), and the like; high density polyethylene, such as Sholex 600 (produced by the Nippon Olefine Chemical Co.), Hizex 2000–J (produced by Mitsui Petrochemical Industries, Ltd.) and the like; polypropylenes, such as Noblen Fa–3 (produced by the Mitsubishi Petrochemical Co., Ltd.), Mitsiu Polypro F–600 (produced by Mitsui Petrochemical Industries, Ltd.) and the like.

The polyolefin film is produced by forming these polyolefins into a sheet-like material having a uniform thickness according to the following conventional processes, for example, by tubular film extrusion or by flat-die extrusion.

On the other hand, the polyolefin coated paper is prepared by melt-applying the polyolefin to the surface of the paper. The production of polyolefin coated papers can usually be achieved by the conventional process, for example, by extrusion coating or by lamination using an adhesive.

The resin for the subcoating used in the present invention is a hydrophilic resin having higher relative dielectric constant and dielectric power factor (for example, for polyethylene, the value of the dielectric constant is 2.3; and the value of the dielectric power factor is $2\text{–}3 \times 10^{-4}$ under the application of a high frequency) than those of the polyolefin and having good adhesion with the photographic emulsion.

Typical examples of suitable hydrophilic resins are gelatin (6–7; $520\text{–}600 \times 10^{-4}$), casein (6–7; $520\text{–}600 \times 10^{-4}$), a vinyl copolymer containing maleic anhydride (9–12; $900\text{–}1400 \times 10^{-4}$), a polyacrylamide/maleic anhydride-stylrene (1:1) copolymer (6–9; $400\text{–}1000 \times 10^{-4}$) and a mixture of polyvinyl pyrrolidone with polyacrylic acid (3–5; $200\text{–}600 \times 10^{-4}$).

The important reason for the hydrophilic resins having both a higher relative dielectric constant and dielectric power factor than those of the polyolefin used is due to the necessity for the microwave energy to be absorbed by the subcoat to a greater extent than the absorption of the polyethylene layer when the microwave energy is applied according to the present invention. In general, a polyolefin generates little heat internally in the application of microwaves because of the polyolefin's small value of the relative dielectric constant and dielectric power factor (loss tangent). Thus, surface properties such as flatness and gloss are not lost at all. The frequency and the power of microwaves used in the present invention generally ranges from 13 mHz. to 22, 125 mHz. and more than 2 watt hr./m.$^2$, respectively. Frequencies especially preferred are those in the higher frequency range. The oscillation strength can also be employed properly.

Thereupon irradiation with microwaves is generally successful by irradiating with the microwave energy inside a wave guide or an oven and guiding the microwave energy, reradiated from the wave guide, to be absorbed by the film or the coated paper and/or guiding the microwave energy to the film or the coated paper is an oven.

In this case, continuous treatment of a film or a coated paper can be easily achieved in continuously passing a film or a coated paper inside the wave guide or the oven. Also, the polyolefin is usually not affected by absorption of the microwave energy thereto unless the electric field of the irradiated microwave is too high.

Therefore, since the strength of the electric field in the use of the foregoing wave guide can be realized by narrowing the short sides of the plural rectangular wave guides respectively, connecting each wave guide in a zigzag form and passing the film or the coated paper through the center of the long sides of the wave guides, the effective absorption of the microwave energy thereto is accomplished by the uniform and rapid heating of the film or the coated paper. The effectual irradiation with microwaves should be carried out under the condition that discharging does not occur, because with discharging, the same circumstances as with the corona discharging treatment occur whereby little activity of the microwave energy can be expected. Since the discharging phenomenon generally results when the irradiating strength of the microwaves is too strong or conductive dusty materials are attached to the film or the coated paper, the irradiation should be careful with respect to the foregoing points.

Consequently, the support obtained according to the process of the invention exhibits a firm adhesion between the subcoat and the polyolefin surface, which has not yet been obtained using only a heating operation after subcoating, and is not lost by the application of a photographic emulsion due to the protective effect of the subcoat previously coated and furthermore less electrostatic charge results as compared with a support without subcoating.

The photographic sensitive material comprising the support of the present invention showed sufficient adhesive strength between the emulsion layer and the support in a wet state during photographic processing and in a dry state before or after processing. The adhesive strength is not lost due to the elapse of time.

In the following examples the adhesive test between the emulsion layer and the support was made as follows:

(1) Method of measuring adhesion in a dry state

After providing a check-shaped linear scar (line intervals of about 4 cm.) to the emulsion surface, applying a pressure-sensitive adhesive tape (i.e., polyester tape, produced by Nitto Electric Industrial Co., Ltd.) thereto and rapidly removing the pressure-sensitive adhesive tape, adhesion can be determined.

In this test the term "good adhesion" is intended to cover the condition in which over 90% of the emulsion to which the tape had been applied remained adhered to the polyolefin support.

(2) Method of measuring adhesion in a processing solution

In each stage of processing, a scratched scar was provided to the emulsion surface with a steel pen in the processing solution. When the emulsion surface is rubbed with finger tip at a right angle to the scarred linear portion, adhesion is regarded as good unless release of more than the scarred line occurs.

EXAMPLE 1

One side of a polyethylene coated paper, obtained by applying low density polyethylene having a density of 0.92 g./cm.$^3$ and a Melt Index of 7 to both sides of a photographic base paper of 150 g./cm.$^2$ using an extrusion coating process, was applied with a subcoating solution having the following composition and dried for 3 minutes at 80° C.

Gelatin: 10 g.
Water. 100 cc.
Methanol: 300 cc.
Formalin:: 0.2 cc.

Microwave energy was applied to the thus subcoated support for two seconds by using a microwave generator (oscillating frequency: 2450 mHz., oscillating power: 1 kw.). Then a gelatin silver halide emulsion having the following composition was applied to the surface of the subcoat to prepare a photographic sensitive material.

The photographic sensitive material exhibited excellent adhesion between the emulsion layer and the support during photographic processing and in a dry state before or after the treatment.

Photographic emulsion composition:
- Gelatin: 70 g.
- Light sensitive silver halide: 62 g.
- AgCl: 65 mol percent
- AgBr: 25 mol percent
- Water to make: 1000 cc.

Developing solution composition:
- Metol: 31 g.
- Sodium sulfite: 450 g.
- Hydroquinone: 120 g.
- Sodium carbonate: 755 g.
- Potassium bromide: 19 g.
- Water to make: 10,000 cc.

EXAMPLE 2

A subcoating solution having the following composition was applied to the surface of a high density polyethylene film having a density of 0.960 g./cm.$^3$, a Melt Index of 3 and a thickness of about 100$\mu$, and dried for 3 minutes at 80° C.

Thereafter, the thus obtained film was treated with microwave energy for 2 seconds using a microwave generator (oscillating frequency: 915 mHz., oscillating power: 2 kw.).

Maleic anhydride-vinyl acetate copolymer (1:1): 10 g.
Methanol: 500 cc.

The same gelatin silver halide emulsion as used in Example 1 was applied to the surface of the subcoating to prepare a photographic sensitive material. The photographic sensitive material obtained was superior in adhesion between emulsion layer and support.

EXAMPLE 3

A subcoating solution having the following composition was applied to one surface of a polypropylene film having a Melt Flow Rate of 10, of about 120$\mu$ thickness, and dried for 2 seconds at 90° C.

Thereafter, the thus obtained film was treated with microwave energy for 2 seconds using the same microwave generator and conditions as used in Example 1.

Maleic anhydride-styrene (1:1) copolymer: 10 g.
Acetone: 350 cc.
Methanol: 150 cc.

The same gelatin silver halide emulsion as used in Example 1 was then applied to the subcoated surface of the thus obtained support to prepare a photographic sensitive material. The photographic sensitive material exhibited superior results in the test for adhesion between the support and the emulsion layer even in both wet and dry states.

EXAMPLE 4

One side of the polyethylene coated paper, obtained by applying a low density polyethylene having a density of 0.92 g./m.$^3$ and a Melt Index of 7 to both sides of a photographic paper of 150 g./m.$^2$ using an extrusion coating process, was applied with a subcoating solution having the following composition and dried for 4 seconds at 80° C. Thereafter, the thus obtained paper was treated with microwave energy for 1 second using the same microwave generator and conditions as used in Example 1.

Polyvinyl pyrrolidone (Lubiskol K–90 produced by BASF Corp.): 70 g.
Polyacrylic acid: 30 g.
1,4-bis(2.3-epoxypropoxy)butane: 10 g.
30% aqueous ammonia: 1 cc.
Water: 10 cc.
Methanol: 5000 cc.

The photographic paper coated with the usual photographic emulsion on the thus obtained support was superior in adhesion between the support and the emulsion. In addition to this, the relative dielectric constant and the dielectric power factor were from 3 to 5, and from 200 to $600 \times 10^{-4}$, respectively.

What is claimed is:

1. A process for producing a support for a photographic sensitive material, which comprises applying a subcoat comprising a hydrophilic resin to the surface of a polyolefin film or a polyolefin coated paper, said resin having a higher relative dielectric constant and a dielectric power factor than the dielectric constant and the dielectric power factor of said polyolefin and good adhesion with a photographic emulsion, and applying microwave energy thereto without discharge conditions.

2. The process according to claim 1, wherein said polyolefin is selected from the group consisting of polyethylene, polypropylene and mixtures thereof.

3. The process according to claim 2, wherein said polyolefin is polypropylene and wherein said hydrophilic resin is a resin having a dielectric constant and electric power factor of greater than 2.3 and from 2 to $3 \times 10^{-4}$, respectively.

4. The process according to claim 1, wherein said resin is selected from the group consisting of gelatin, casein, a vinyl copolymer containing maleic anhydride, a polyacrylamide/maleic anhydride-styrene copolymer and a mixture of polyvinyl pyrrolidone with polyacrylic acid.

5. The process according to claim 1, wherein said microwave energy has a frequency ranging from 13 mHz. to 22,125 mHz.

6. A support for a photographic sensitive material prepared by the process according to claim 1.

References Cited

UNITED STATES PATENTS

| | | | |
|---|---|---|---|
| 3,585,063 | 6/1971 | Remmington | 117—47 |
| 3,582,339 | 6/1971 | Martens et al. | 117—34 |
| 3,411,910 | 11/1968 | Crawford et al. | 96—87 |
| 3,565,624 | 2/1971 | Uffindell | 117—34 |
| 3,600,217 | 8/1971 | Eichhorn et al. | 96—87 |
| 3,475,193 | 10/1969 | Takenaka | 117—34 |

NORMAN G. TORCHIN, Primary Examiner

E. C. KIMLIN, Assistant Examiner

U.S. Cl. X.R.

117—34, 93.1 DH; 96—87